(12) United States Patent
Samaras et al.

(10) Patent No.: US 6,486,392 B1
(45) Date of Patent: Nov. 26, 2002

(54) HYDROCARBON FIRED THERMOPHOTOVOLTAIC ELECTRIC GENERATOR INSERT HAVING LOW BANDGAP CELLS FOR USE AS A REPLACEMENT BURNER IN AN APPLIANCE RETROFIT

(75) Inventors: John E. Samaras, Seattle, WA (US); Lewis M. Fraas, Issaquah, WA (US)

(73) Assignee: JX Crystals Inc., Issaquah, WA (US)

( * ) Notice: Subject to any disclaimer, the term of this patent is extended or adjusted under 35 U.S.C. 154(b) by 0 days.

(21) Appl. No.: 08/732,987

(22) Filed: Oct. 16, 1996

(51) Int. Cl.[7] ............................................... H01L 31/00
(52) U.S. Cl. ..................................................... 136/253
(58) Field of Search ........................................ 136/253

(56) References Cited

U.S. PATENT DOCUMENTS

| | | | |
|---|---|---|---|
| 3,433,676 A | 3/1969 | Stein | 136/89 |
| 3,751,303 A | 8/1973 | Kittl | 136/89 |
| 4,234,352 A | 11/1980 | Swanson | 136/253 |
| 4,707,560 A | 11/1987 | Hottel et al. | 136/253 |
| 4,776,895 A | 10/1988 | Goldstein | 136/253 |
| 4,906,178 A | 3/1990 | Goldstein et al. | 431/79 |
| 4,976,606 A | 12/1990 | Nelson | 431/79 |
| 5,057,162 A * | 10/1991 | Nelson | 136/253 |
| 5,312,521 A | 5/1994 | Fraas et al. | 136/253 |
| 5,356,487 A | 10/1994 | Goldstein et al. | 136/253 |
| 5,383,976 A | 1/1995 | Fraas et al. | 136/253 |
| 5,389,158 A | 2/1995 | Fraas et al. | 136/244 |
| 5,401,329 A | 3/1995 | Fraas et al. | 136/253 |
| 5,403,405 A | 4/1995 | Fraas et al. | 136/253 |
| 5,439,532 A | 8/1995 | Fraas | 136/253 |
| 5,512,108 A * | 4/1996 | Noreen | 136/253 |
| 5,512,109 A | 4/1996 | Fraas et al. | 136/253 |
| 5,551,992 A | 9/1996 | Fraas | 136/253 |
| 5,560,783 A | 10/1996 | Hamlen | 136/253 |

OTHER PUBLICATIONS

H.A. Macleod, "Thin–Film Optical Filters", McGraw–Hill Publishing Company, pp. 499–502 (1989).

Hofler et al., "Selective Emitters for Thermophotovoltaic Solar Energy Conversion", Solar Cells, vol. 10, pp. 257–271 (Dec. 1983).

* cited by examiner

*Primary Examiner*—Mark Chapman
(74) *Attorney, Agent, or Firm*—James Creighton Wray; Meera P. Narasimhan

(57) ABSTRACT

A hydrocarbon thermophotovoltaic (TPV)electric generator insert has applications as a replacement burner to retrofit existing appliances. The retrofitted appliance is thus upgraded to either a cogeneration or self-powered unit. The design of the TPV burner insert is independent of the appliance to be retrofitted except for external adapters and can be easily retrofitted to any appliance design requiring a hydrocarbon burner. The burner uses fully premixed air and fuel near stoichiometry to attain a short duration, high intensity burn through optically dense porous ceramic emitters. The emitters attain temperatures between 1300° and 1500° C. The infrared radiation is collected by low bandgap photovoltaic cells with optical response at least out to a wavelength of 1.7 micrometers such as GaSb cells to produce DC power. The circuit cooling system uses fans or circulating water for cooling.

26 Claims, 5 Drawing Sheets

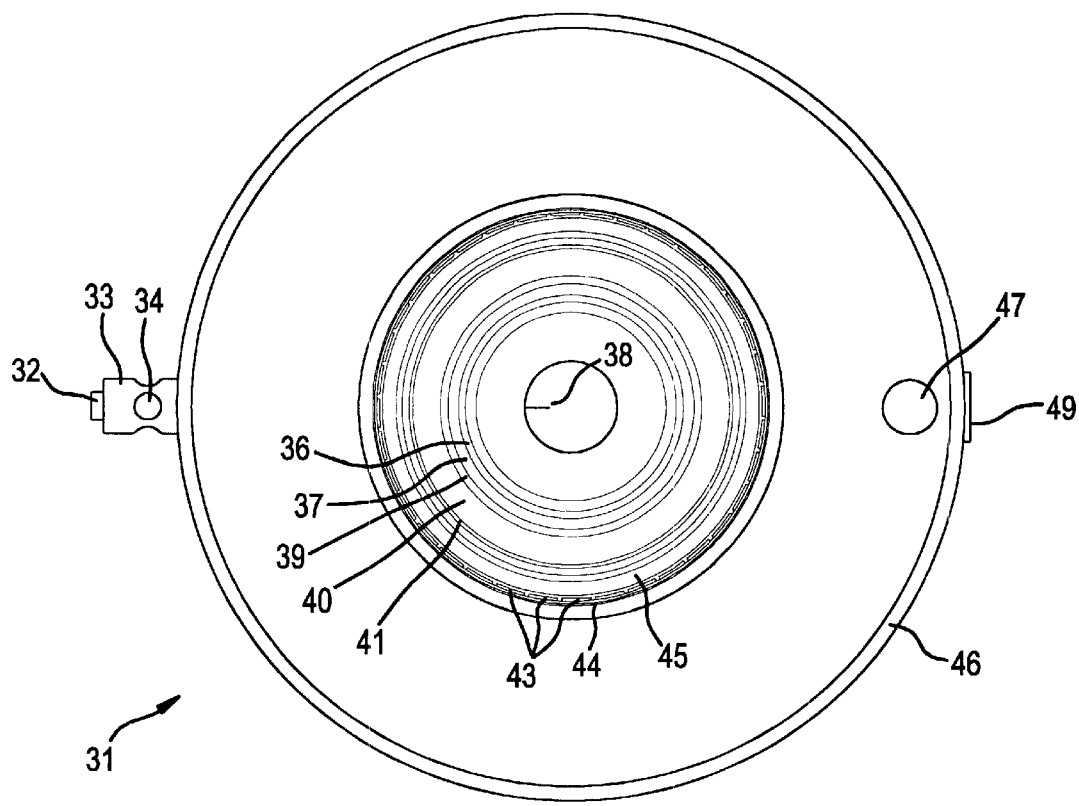
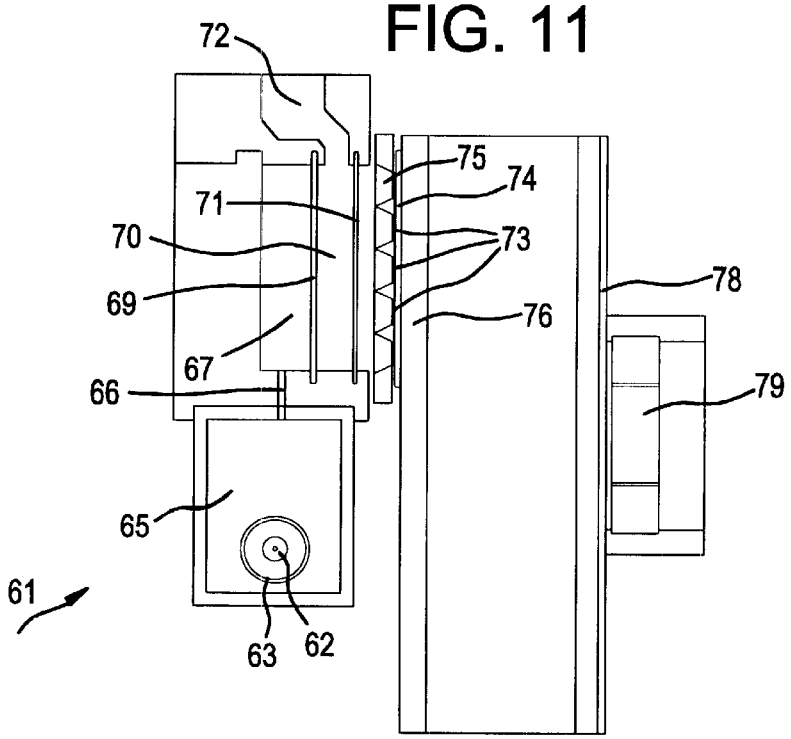

HYDROCARBON FIRED THERMOPHOTOVOLTAIC ELECTRIC GENERATOR INSERT HAVING LOW BANDGAP CELLS FOR USE AS A REPLACEMENT BURNER IN AN APPLIANCE RETROFIT

BACKGROUND OF THE INVENTION

The present invention relates to thermophotovoltaic (TPV) power generators for converting fuel to electricity using a minimum number of moving parts.

High efficiency conversion of fuel energy into electrical energy using TPV cells requires burner configurations designed specifically for TPV generation. Those designs incorporate heat exchangers, cell receiver cooling systems, infrared filters, mirrors and windows for spectral control, and special high temperature ceramic emitters. Existing units for TPV generation include high efficiency stand-alone TPV generators and appliances having configurations specifically matched to the TPV generator designs. Those units are too restrictive for immediate practical appliance retrofit applications. In typical high efficiency designs, a regenerator is required to preheat the combustion air (recovering heat from the exhaust) and to boost flame temperatures. That requirement complicates the fuel/air mixing and mandates higher pressures for the combustion gases. To obtain higher efficiencies, the TPV cell cooling system must be closely coupled to the burner/emitter/receiver combination. To meet that requirement, appliances must be inherently modified, leading to complicated designs of appliances such that existing appliances cannot be used directly. Needs exist for practical TPV power generating units that are compatible for use with existing appliances.

Existing appliance burner designs are inappropriate for adapting directly to TPV generation even at lower efficiencies. Existing appliances operate at much lower temperatures, with radiative emissions kept low to simplify burner material selection. To retrofit appliances for TPV, the entire burner unit must be replaced by new units specifically designed to attain the required high temperatures. Needs exist for universal TPV generator inserts for use in appliances which do not require modification of the appliances nor complex, complicated designs.

SUMMARY OF THE INVENTION

The present invention is a TPV generator insert for retrofitting appliances. The original burners of existing appliances are replaced by the present TPV generator inserts, thus upgrading the appliances into either cogeneration or self-powered units. Examples of appliances which may be retrofitted using the present invention include all appliances requiring hydrocarbon burner assemblies, such as residential, industrial, or commercial equipment. Those appliances include but are not limited to forced air and hydronic space heaters, water heaters, (ammonia) absorption cycle coolers, refrigerators and air conditioning systems. Immediate applications for the present invention range from simple units with several watts of electric output for ignition and controls to several hundred watt self-powered appliances requiring electrical power for fans or pumps. Self-powered units requiring at minimum a small battery for electric storage may be used for automatic controls during times when there is no TPV output. Cogeneration units are typically tied into a system including a battery storage bank, charge controller, or the like, and draw power from the system to operate their automatic controls.

Hydrocarbon fired appliances are prevalent throughout our society. In many cases those appliances are capable of generating commercially attractive electrical power outputs or sufficient electric power to render an appliance independent from frequent and unpredictable electric power outages. A hydrocarbon fired appliance retrofitted with the present TPV burner insert not only provides the appliance's primary function, such as water heating, space heating or cooling, but also provides surplus electrical power generation as a cogenerator or independent electrical power generation as a self-powered appliance.

The present TPV burner insert is capable of retrofitting any existing hydrocarbon burner-based appliance. High electrical efficiency is not a concern, as fuel to electric conversion efficiency is less important for appliances to be converted into cogeneration or self-powered units. That lack of importance results from the higher grade "waste" heat, which is the primary heat source for the appliance's operation. The total efficiency (combined electric and appliance output) is more important from a practical standpoint. By making the TPV cell cooling integral to the standard burner insert, near independence from existing appliance designs is achieved. The standard design of the present TPV burner insert is independent of the appliance to be retrofitted other than the general shape and size. Those dimensions are modified as appropriate. In the present insert, only adapters must be specific to any particular appliance. Those adapters generally include simple sheet metal and plates to mount the insert at an appropriate location in the appliance.

The present invention uses a simple, low efficiency burner in contrast to potentially higher efficiency, but more complex burners with regeneration. The maximum theoretical emitter temperatures attainable using the present insert are lower than with a regenerator, as no heat escaping in the exhaust is recaptured. The present invention avoids the high pressure requirements and problems associated with incomplete mixing. Longer burn times which tend to produce higher yields of $NO_x$ are also avoided. The high grade exhaust heat is routed and used by the appliance including the present insert.

The present burner thoroughly premixes near stoichiometric air with the fuel, maintains the mix at low temperatures to prevent preignition, and then rapidly burns the mix with high intensity just prior to forcing the ignited mix through the porous ceramic emitter. The fuel/air ratio is adjusted empirically to attain the highest temperature from the emitter, typically ranging between 1300–1500° C.

The burner for the present TPV retrofit insert is based on the "perfectly stirred reactor" combustion design theory. In a simplest embodiment the burner includes a premix tube into which the fuel and air are injected at high velocities. That mixture proceeds into an expansion chamber where the mixing is completed as the gases slow down and equilibrate in pressure to give a highly flammable but cold mix. A small channel connects the expansion chamber to an insulated combustion chamber. The gases flow at high velocities from the expansion chamber to the insulated combustion chamber to prevent flashback. The gas combustion, once initiated in the combustion chamber, is very rapid and intense with short duration, briefly yielding extremely high temperatures before being forced to cool as the gas passes through the thin porous ceramic emitter and out the exhaust channel. Secondary combustion occurs beyond the insert in the appliance where adequate excess air is supplied to burn any unburned gases. The high temperature but very short duration burn of the present invention minimizes $NO_x$ generation. Since the gases are completely premixed, a uniform emitter temperature results. The entire combustion chamber is fabricated from vacuum formed high temperature alumina "foam" insulation with very low thermal conductivity, low absorptivity and emissivity, and high diffuse reflectivity. The porous ceramic emitters may be fabricated from numerous types of high temperature materials. The radiation from the emitter is directed by the combustion chamber's shape towards TPV cell receivers through a transparent high temperature quartz or sapphire heat shield or window. The radiation is further directed by infrared optical confinement mirrors and spectrally controlled by optical filters which transmit the useful portions of the radiation to the cells of the receiver and reflect the longer wavelength portion back towards the emitter. For practical applications the TPV cells of the present invention are preferably low bandgap photovoltaic cells which respond at least out to a wavelength of 1.7 micrometers.

There are three general embodiments of the present TPV retrofit burner insert assembly: a two-sided linear insert, a one-sided cylindrical insert, and a one-sided linear insert. Those embodiments differ in the geometry and symmetry of the radiation emitter/heat shield/cell path. All three embodiments exhibit common features and each will be described later in more detail. The two-sided linear insert is a simple compact unit with mirror symmetry. In one application, the two-sided linear insert is used to retrofit a small room heater and includes a linear combustion chamber having two opposing vertical flat emitters facing out towards two flat TPV circuits. If one half of that unit were to be split off in the middle along the symmetry line then curved and extended back onto itself, the one-sided cylindrical unit embodiment of the present insert is formed. The combustion chamber of the cylindrical embodiment requires a very thick insulating back wall (inside) opposing the (cylindrical) emitter which faces a circular array of TPV cells outside. That forms a circular burner insert which, in one preferred application, is used to retrofit a hot water heater, which typically has a cylindrical storage tank. The one-sided linear insert embodiment of the present invention is intermediate in design between the other two embodiments. The one-sided linear insert has a linear combustion chamber with a flat vertical emitter facing out towards a flat TPV circuit. The combustion chamber has a very thick insulating back wall opposing the emitter. That embodiment of the present burner insert has one application for retrofitting a home furnace into a self-powered unit, where the burner can only interface into one side of the furnace. With the one-sided linear insert embodiment the cell array and its cooling system are on the outside face of the furnace.

The three embodiments are generic ones, with many others being possible. Any one of those embodiments may be adapted to any appliance with proper scaling and adapters, although some are more appropriate than others. The common components of the different embodiments, including emitters, heat shields, cooling systems and components, are interchangeable between the different embodiments as needed.

These and further and other objects and features of the invention are apparent in the disclosure, which includes the above and ongoing written specification, with the claims and the drawings.

BRIEF DESCRIPTION OF THE DRAWINGS

FIG. 10 is a horizontal cross-section through the burner, cell circuit and water cooling/preheat tank of the cylindrical TPV generator insert of FIG. 8.

FIG. 11 is a vertical cross-section of a single-sided TPV generator insert.

DETAILED DESCRIPTION OF THE PREFERRED EMBODIMENTS

Figure 1:
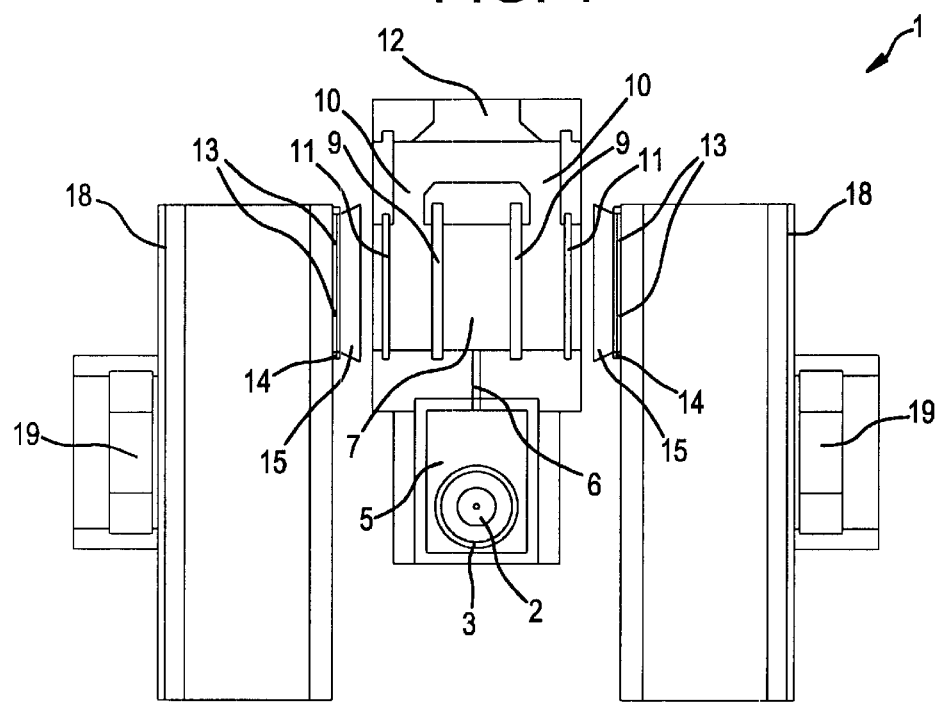
FIG. 1 is a vertical cross-section of a double sided TPV generator insert.
Figure 2:
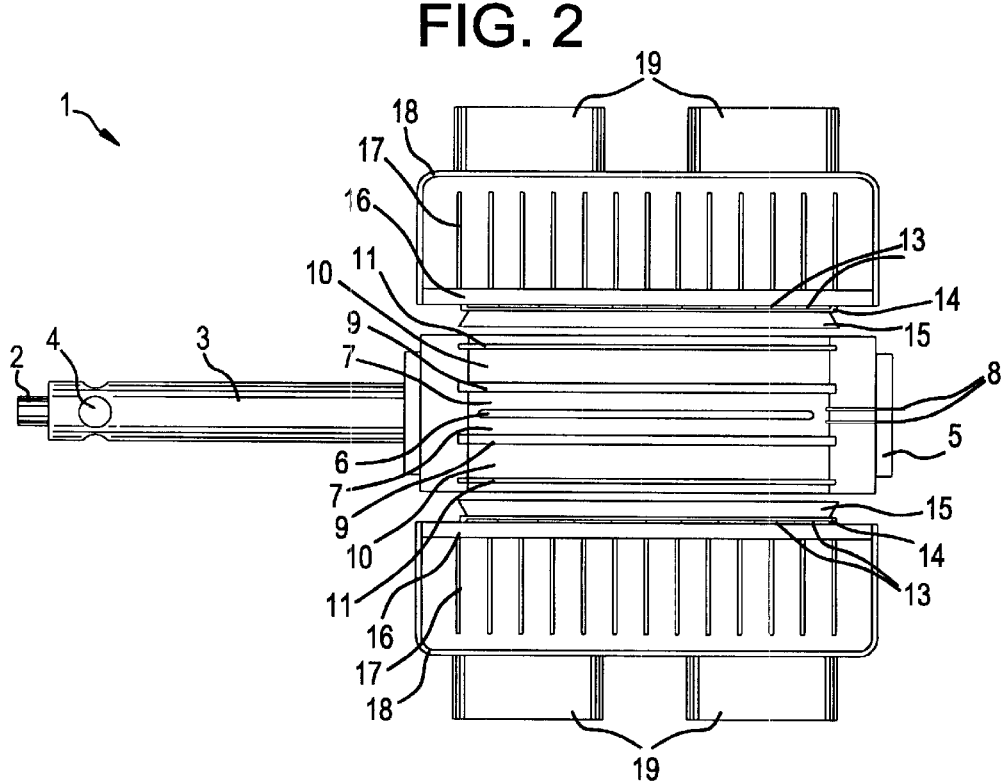
FIG. 2 is a horizontal cross-section through the burner, cell circuits, cooling fins and fans of the TPV generator insert of FIG. 1.
Figure 3:
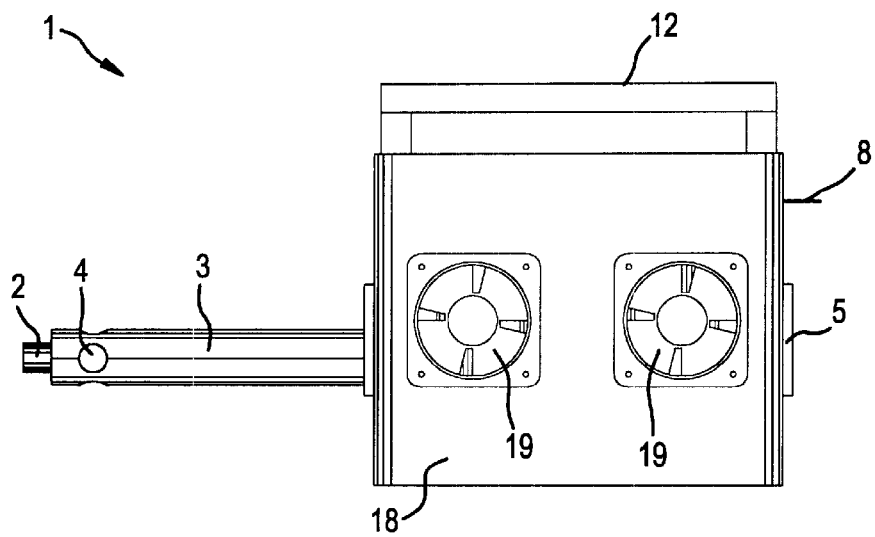
FIG. 3 is a front view of the TPV generator insert of FIG. 1.
Figure 4:
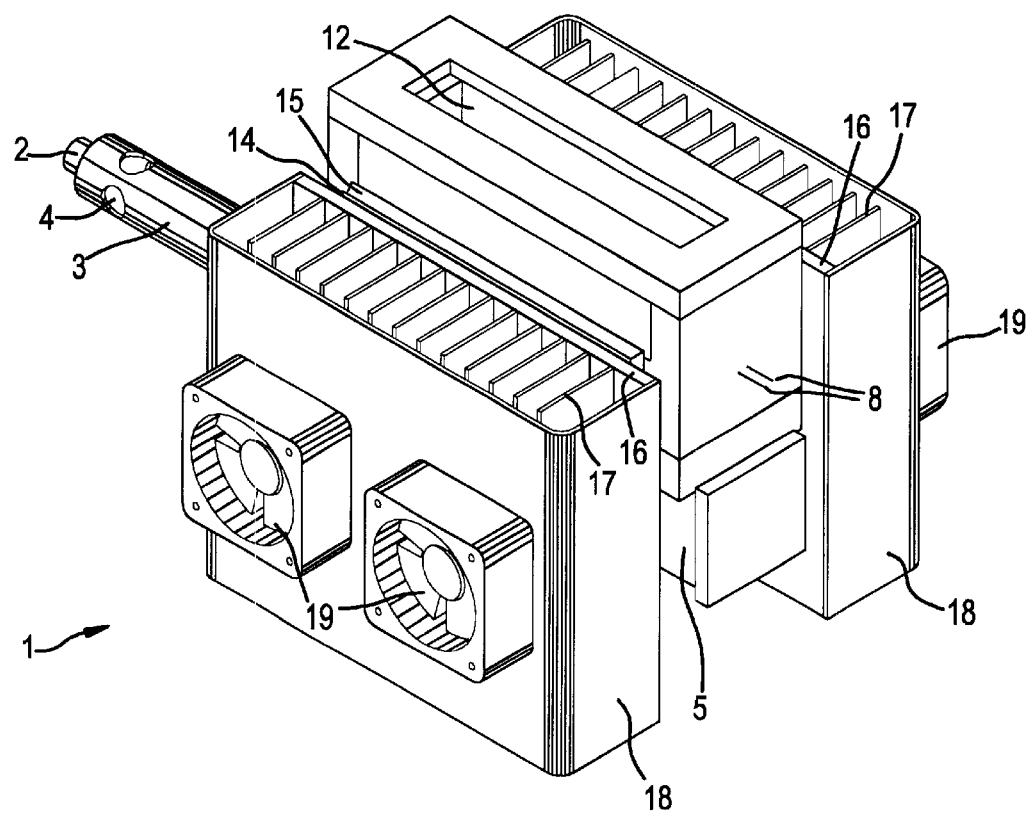
FIG. 4 is a perspective view of the TPV generator insert of FIG. 1.

FIGS. 1–4 show various views of a two sided TPV generator insert 1 which, in one application, retrofits a small appliance such as a wall heater. The hydrocarbon fuel is injected through an orifice spud 2 into a mixing tube 3 where it is mixed with air entering through the air inlets 4. The fuel air mixture proceeds into the expansion chamber 5 wherein the partially premixed gases complete their mixing as they are allowed to slow down and equilibrate in pressure. The cooled gas mixture then moves at high velocity through a restricting channel 6 connecting the expansion chamber 5 to the combustion chamber 7. The gas mixture is initially ignited in the combustion chamber 7, preferably by the ignition and flame sense electrodes 8, until the chamber walls become hot enough to auto-ignite the gases. The ignition and flame sense electrodes 8 are then used by the control unit (not shown) to continually monitor for combustion. The combusted gases are forced through the emitters 9 which are rapidly heated to very high temperatures. The exhaust gases are confined in the exhaust channels 10 between the emitters 9 and the transparent heat shields 11 and directed out the exhaust opening 12. The exhaust gases at this point are in the form of a high grade heat, equivalent to the output of a typical burner, and can be directed to the appliance through an appropriate adapter. The high temperature emitters 9 emit infrared radiation which passes through the transparent heat shields 11 to the optical filters and photovoltaic cells 13 which are mounted on a circuit. The circuit 14 converts the infrared radiation into DC electric power. The shape and construction of the burner guides the radiation from the emitters 9 towards the optical filters and photovoltaic cells 13. The radiation is further confined by angled optical confinement mirrors 15 which serve to minimize radiation losses. For excess heat removal, the circuit 14 is mounted on a receiver plate 16 with cooling fins 17. The receiver plate 16 and cooling fins 17 are enclosed by a fan cowling 18 which directs the cooling air from the fans 19 through the fins. In the case of a space heating appliance, the output from the cooling section can be used directly for space heating.

Figure 5:
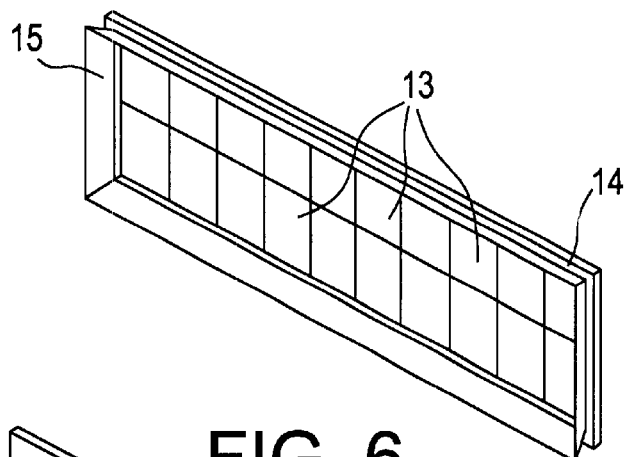
FIGS. 5–7 are perspective views of three receiver circuits showing three possible types of optical confinement mirror assemblies which can be used in TPV generator inserts.
Figure 6:
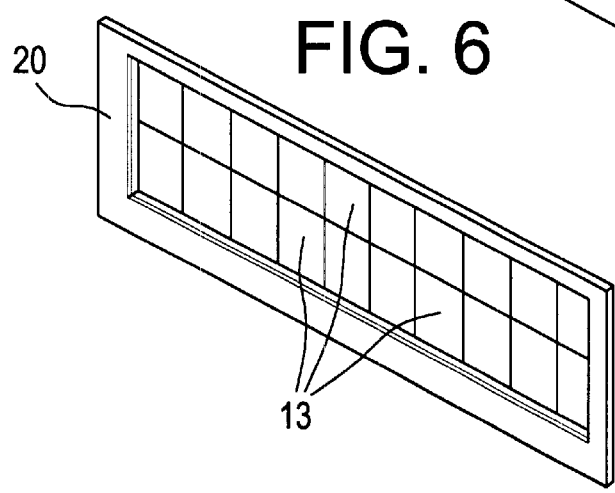
Figure 7:
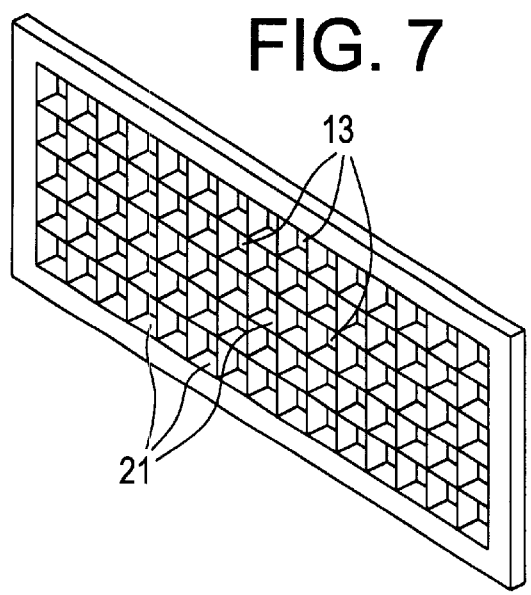

FIGS. 5–7 show three preferred embodiments of infrared optical confinement mirrors for use in the present invention. In FIG. 5, the receiver includes angled optical confinement mirrors 15 positioned around the perimeter of the circuit 14 for protecting the circuit 14 and for directing the radiation towards the optical filters and photovoltaic cells 13. In FIG. 6, the receiver includes flat optical confinement mirrors 20. Mirrors 20 protect the perimeter of the circuit 14 by directing the radiation back towards the emitter or away from the circuit. In FIG. 7, the receiver includes "waffle" optical confinement mirrors 21 for directing the radiation only onto the active region of each photovoltaic cell, thereby preventing radiative absorption losses on the circuit in between the active regions of the cell array. The mirror walls around each cell of the "waffle" optical confinement mirrors 21 use the same angle as the angled optical confinement mirrors 15 to form an array of individual truncated pyramidal structures. That mirror type is ideally suited for more complex and larger circuits where more of the area between cells would otherwise be exposed to the radiative heat load. The "waffle" type of mirror has the added advantage of controlling the view factor of each cell, similar to horse "blinders," thus restricting the total energy available to the central cells and preventing excess radiation (heat load) from reaching them relative to the perimeter cells. Of the three possible embodiments shown in FIGS. 5–7, each could be used in any application. Generally the flat mirrors shown in FIG. 6 are the simplest, cheapest but least effective. The "waffle" mirrors shown in FIG. 7 are the most complex and expensive, but also the most effective optical confinement mirrors.

Figure 8:
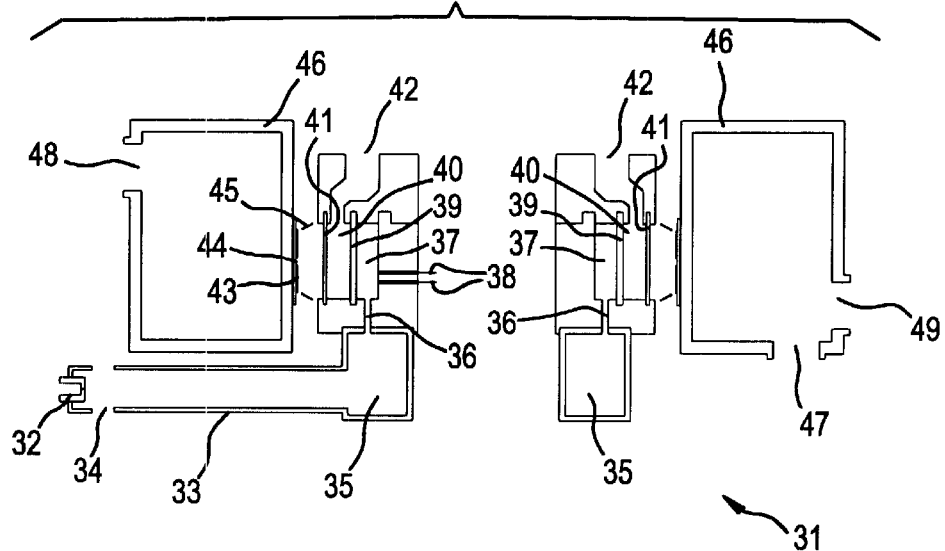
FIG. 8 is a schematic vertical cross-section of a cylindrical TPV generator insert.
Figure 9:
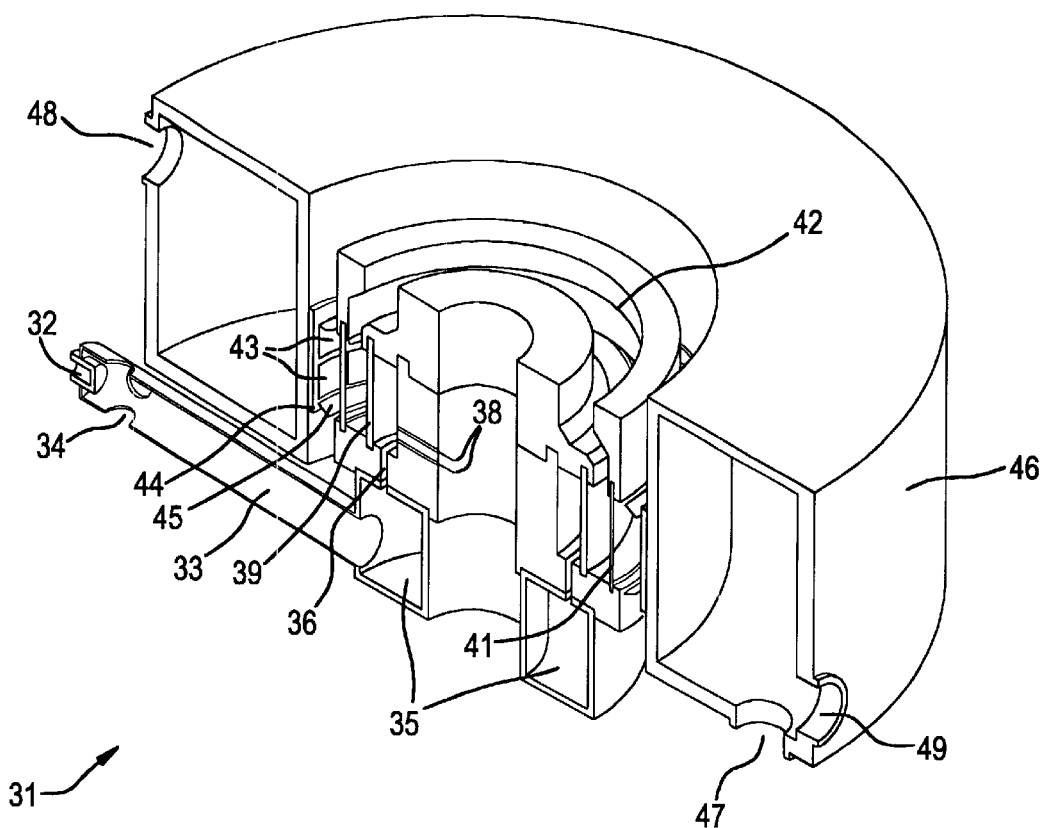
FIG. 9 is a perspective view of a vertical cross-section through the cylindrical TPV generator insert of FIG. 8.

FIGS. 8–10 show a cylindrical TPV generator insert 31 which, in one application, is used to retrofit an intermediate sized appliance such as a hot water heater. The hydrocarbon fuel is injected through an orifice spud 32 into a mixing tube 33 where the fuel is mixed with air entering through the air inlets 34. The fuel/air mixture proceeds into the expansion chamber 35 where the partially premixed gases complete their mixing and are allowed to slow down and equilibrate in pressure. The cooled gas mixture then moves at high velocity through a restricting channel 36 connecting the expansion chamber 35 to the combustion chamber 37. The gases are initially ignited in the combustion chamber 37 by the ignition and flame sense electrodes 38 until the chamber walls become hot enough to auto-ignite the gases. The ignition and flame sense electrodes 38 are preferably used by the control unit (not shown) to continually monitor for combustion. The combusted gases are forced through the emitter 39 which is rapidly heated to very high temperatures. The exhaust gases are confined in the exhaust channel 40 between the emitter 39 and the transparent heat shields 41 and directed out the exhaust opening 42. The exhaust gases at this point are in the form of a high grade heat, equivalent to the output of a typical burner, and can be directed to the appliance through an appropriate adapter. The high temperature emitter 39 emits infrared radiation which passes through the transparent heat shield 41 to the optical filters and photovoltaic cells 43. The cells 43 are mounted on a circuit 44. The circuit 44 converts the infrared radiation to DC electric power. The shape and construction of the burner guides the radiation from the emitter 39 towards the optical filters and photovoltaic cells 43. The radiation is further confined by angled optical confinement mirrors 45 which serve to minimize radiation losses. For excess heat removal, the circuit 44 is mounted on a water cooling/preheat tank 46. Tank 46 has a fresh water inlet 47 connected to the cold water main and a warm water outlet 48 connected to an available fitting near the middle of the appliance hot water tank. A thermosiphon loop is completed between the hot water tank and the preheat tank by connecting the bottom of the hot water tank to the bottom of the preheat tank at the cold water return inlet 49. In operation the optical filters and photovoltaic cells 43 and the circuit 44 are cooled either by the incoming fresh water to the water cooling/preheat tank 46 or by the denser cool water flowing down from the hot water tank thermosiphon loop. When the hot water demand from the appliance ceases, the burner continues to operate driving the thermosiphon between the two tanks. The burner is automatically shut off by the thermostat when the tank is again full of hot water (50–60° C. depending on the thermostat setting).

FIG. 11 shows the one sided TPV generator insert 61 which, in one application, is used to retrofit a large appliance such as a self-powered home furnace. The hydrocarbon fuel is injected through an orifice spud 62 into a mixing tube 63 where the fuel is mixed with air entering through air inlets in the tube 63. The fuel/air mixture proceeds into the expansion chamber 65 where the partially premixed gases complete their mixing and are allowed to slow down and equilibrate in pressure. The cooled gas mixture moves at high velocity through a restricting channel 66 connecting the expansion chamber 65 to the combustion chamber 67. The gas mixture is initially ignited in the combustion chamber 67 by the ignition and flame sense electrodes until the chamber walls become hot enough to auto-ignite the gases. The ignition and flame sense electrodes are then used by the control unit to continually monitor for combustion. The combusted gases are forced through the emitter 69 which is rapidly heated to very high temperatures. The exhaust gases are confined in the exhaust channel 70 between the emitter 69 and the transparent heat shield 71 and directed out the exhaust opening 72. The exhaust gases at this point are in the form of a high grade heat, equivalent to the output of a typical burner, and can be directed to the appliance through an appropriate adapter. The high temperature emitter 69 emits infrared radiation which passes through the transparent heat shield 71 to the optical filters and photovoltaic cells 73. Cells 73 are mounted on a circuit 74. The circuit 74 converts the infrared radiation into DC electric power. The shape and construction of the burner guides the radiation from the emitter 69 towards the optical filters and photovoltaic cells 73. The radiation is further confined by "waffle" optical confinement mirrors 75 which serve to minimize radiation losses. For excess heat removal, the circuit 74 is mounted on a receiver plate 76 with cooling fins 77. The receiver plate 76 and cooling fins 77 are enclosed by a fan cowling 78 which directs the cooling air from the fans 79 through the fins. Again, in the case of a space heating appliance, the output from the cooling section can be used directly for space heating.

There are numerous methods of premixing the air with the fuel prior to injecting the mixture into the expansion chamber. In the simplest case, a high pressure fuel is injected into the tube at high velocities. The high velocity fuel then aspirates the air into the tube causing turbulent mixing. In another embodiment, when using low pressure fuel sources, a combustion blower is used to create turbulent mixing of the fuel and air. That method has the added advantage of minimizing extinction pop since the blower continues to operate as the fuel is cleared out of the system during shutdown. Depending on the needs or constraints the application, any one of a number of different techniques may be used for cooling the TPV circuit and cells.

Those techniques include, but are not limited to, natural or forced air convection, natural or forced liquid convection, and convective cooling with phase change. The burner insert size may be scaled to match the needs of the appliance. Any suitable adapter may be used between any of the embodiments of the burner insert and any type of appliance which requires a burner.

Various changes and alterations may be made without parting from the spirit of this invention. All changes and modifications which fall within the scope of the claims and equivalents thereof are intended to be embraced thereby.

While the invention has been described with reference to specific embodiments, modifications and variations of the invention may be constructed without departing from the scope of the invention, which is defined in the following claims.

We claim:

1. A replacement burner thermophotovoltaic generator insert apparatus for use in an existing or newly designed appliances comprising a hydrocarbon burner having a combustion chamber for generating a flame, with the burner having a fuel inlet being removably connectable to a fuel supply, at least one emitter positioned with respect to the flame for emitting infrared radiation when heated by the flame, at least one receiver spaced from the at least one emitter for receiving the infrared radiation and for converting the infrared radiation to electric power, each receiver further comprising a circuit having an inner surface facing the emitter and an outer surface, and thermophotovoltaic cells connected to the inner surface of the circuit, optical elements mounted on each receiver for directing the infrared radiation emitted by the emitter towards the thermophotovoltaic cells, a heat shield positioned between the at least one emitter and the at least one receiver, and a cooling assembly positioned proximate the outer surface of the circuit of the at least one receiver for removing heat from the receiver and for allowing operation to be independent from a design of the appliance.

2. The apparatus of claim 1, wherein a first adapter connects the burner inlet to the fuel supply, and wherein a second adapter connects an exit port of the combustion chamber to the appliance.

3. The apparatus of claim 1, wherein the burner further comprises a mixing plenum wherein the fuel and air are turbulently premixed, an expansion chamber wherein the premixed gases are allowed to complete mixing, slow down and equilibrate in pressure by expanding, a restricting channel formed at a connection of the expansion chamber to the combustion chamber, a combustion chamber wherein the premixed gases are ignited and forced through the at least one emitter, and at least one exhaust channel wherein exhaust gases are redirected from the at least one emitter to an exhaust exit opening.

4. The apparatus of claim 3, wherein the mixing plenum is a tube having air inlets, a first end connected to the expansion chamber and a second end having an orifice for receiving and delivering a high pressure fuel stream axially along a center of the tube such that the fuel stream aspirates enough air through the air inlets and premixes with the air along a length of the tube such that a nearly stoichiometric high intensity burn occurs in the combustion chamber.

5. The apparatus of claim 3, wherein the mixing plenum is a tube having air inlets, a first end connected to the expansion chamber, a second end having an orifice for receiving and delivering a low pressure fuel stream axially along a center of the tube, and a combustion blower for injecting high velocity air through the air inlets for premixing the air with the fuel along the length of the tube such that a nearly stoichiometric high intensity burn occurs in the combustion chamber.

6. The apparatus of claim 3, wherein the mixing plenum further comprises a metal chamber connected to a side other than a top of the expansion chamber, wherein the metal chamber has an inlet for receiving a low pressure, low velocity fuel stream, and a combustion blower positioned with respect to the metal chamber for turbulently premixing the air and the fuel such that a nearly stoichiometric high intensity burn occurs in the combustion chamber.

7. The apparatus of claim 3, wherein the expansion chamber is a metal chamber having an opening for receiving premixed gases from the mixing plenum and a slot positioned along most of a top of the expansion chamber, wherein the expansion chamber has dimensions for allowing the premixed gases to expand, slow down and equilibrate in pressure.

8. The apparatus of claim 3, wherein the combustion chamber and exhaust channels are constructed entirely of white, diffuse reflecting, refractory insulating material, and wherein the restricting channel is formed where an inlet slot of the combustion chamber overlaps an outlet slot of the expansion chamber.

9. The apparatus of claim 8, wherein the at least one emitter further comprises a vertical, optically dense, porous ceramic emitter panel running a length of the inlet slot, wherein the receiver is positioned parallel to the emitter.

10. The apparatus of claim 9, wherein the heat shield is positioned outside of the combustion chamber between the receiver and the emitter, and wherein the heat shield is made of a material selected from the group consisting of fused silica, Vycore® and sapphire.

11. The apparatus of claim 10, wherein platinum or platinum alloy ignitor and flame sense electrodes are located just inside the refractory insulating combustion chamber wall and pass out through the same wall to electrical terminations.

12. The apparatus of claim 1, wherein the at least one emitter further comprises first and second emitters positioned on opposite sides of the combustion chamber, wherein the receiver further comprises a first receiver positioned adjacent the first emitter and a second receiver positioned the second emitter, wherein the heat shield further comprises a first heat shield positioned between the first receiver and first emitter and a second heat shield positioned between the second receiver and second emitter, and wherein the combustion chamber further comprises an exhaust opening.

13. The apparatus of claim 1, wherein the cooling assembly further comprises a receiver plate connected to the outer surface of the circuit of each receiver, cooling fins extending from the receiver plate, a fan cowling for enclosing the receiver plate and cooling fins, and fans for directing cooling air to the fins, and wherein the cowling further comprises an exit port for venting hot air removed from the fins.

14. The apparatus of claim 1, wherein the optical elements mounted on each receiver includes mirrors to direct most of the infrared radiation to active regions of the thermophotovoltaic cells and infrared filters to pass useful portions of the radiation.

15. The apparatus of claim 14, wherein the optical elements further comprise optical confinement mirrors selected from the group consisting of angled optical confinement mirrors positioned around a perimeter of the circuit of each receiver, flat optical confinement mirrors positioned around the perimeter of the circuit of each receiver, and waffle optical confinement mirrors positioned around each cell of the receiver.

16. The apparatus of claim 1, further comprising an electrical conduit for delivering generated electrical power from the receiver to a power supply of the appliance.

17. The apparatus of claim 1, wherein the thermophotovoltaic cells are selected from the group consisting of GaSb cells, InGaAs cells, and $In_xGa_{1-x}As_ySb_{1-y}$ cells, wherein x and y have values between and including about 0.0 and 1.0 such that the cells have an optical response at least out to a wavelength of about 1.7 micrometers or longer.

18. The apparatus of claim 1, wherein the cooling system further comprises a preheat tank connected to the outer surface of the receiver, and wherein the tank has a fresh water inlet, a warm water outlet connected to a hot water tank of the appliance and a cold water return inlet positioned at a bottom of the preheat tank and connected to the hot water tank.

19. The apparatus of claim 18, wherein a thermostat is electronically connected to the burner for controlling operation of the burner.

20. The apparatus of claim 1, wherein the burner further comprises a mixing plenum wherein the fuel and air are turbulently premixed, an expansion chamber wherein the premixed gases are allowed to complete mixing, slow down and equilibrate in pressure by expanding, a restricting channel formed at a connection of the expansion chamber to the combustion chamber, a combustion chamber wherein the premixed gases are ignited and forced through the at least one emitter, and at least one exhaust channel wherein exhaust gases are redirected from the at least one emitter to an exhaust exit opening, wherein the at least one emitter further comprises first and second generally parallel, linear emitters positioned on opposite sides of the combustion chamber, and wherein the at least one receiver further comprises a first generally linear receiver spaced from the first emitter and a second generally linear receiver spaced from the second emitter.

21. The apparatus of claim 1, wherein the at least one emitter is generally cylindrical, wherein the heat shield is generally cylindrical and surrounds the emitter, wherein the at least one receiver is a generally cylindrical receiver surrounding the heat shield, and wherein the cooling assembly is generally cylindrical and surrounds the receiver.

22. The apparatus of claim 1, wherein the at least one emitter is a single linear emitter, and wherein the receiver is a single generally linear receiver.

23. A method for thermophotovoltaic power generation comprising providing an assembly having a mixing plenum, an expansion chamber connected to the mixing plenum, a combustion chamber connected to the expansion chamber, an emitter positioned in the combustion chamber, a receiver spaced from the emitter, a heat shield positioned between the receiver and the emitter, and a cooling system connected to the receiver, delivering fuel and air to the premix tube, premixing the fuel and the air in the premix tube at high velocities to create a fuel/air mixture, expanding the fuel/air mixture in the expansion chamber to create a highly flammable and cold mix, delivering the mix at high velocities to the combustion chamber, initiating combustion of the mix in the combustion chamber, passing combustion gases through the emitter to heat the emitter, emitting radiation from the heated emitter, passing the emitted radiation through the heat shield, directing the infrared radiation towards thermophotovoltaic cells of the receiver, collecting the directed infrared radiation in the cells, generating electric power in the receiver and cooling the receiver.

24. The method of claim 23, wherein the premixing step comprises injecting high pressure fuel into the tube at high velocities and aspirating air into the tube.

25. The method of claim 23, wherein the premixing step comprises blowing air into the tube for violently mixing the fuel and the air.

26. The method of claim 23, wherein the step of cooling the receiver is selected from the group consisting of natural air convection, forced air convection, natural liquid convection, forced liquid convection and convective cooling with phase change.

* * * * *